UNITED STATES PATENT OFFICE.

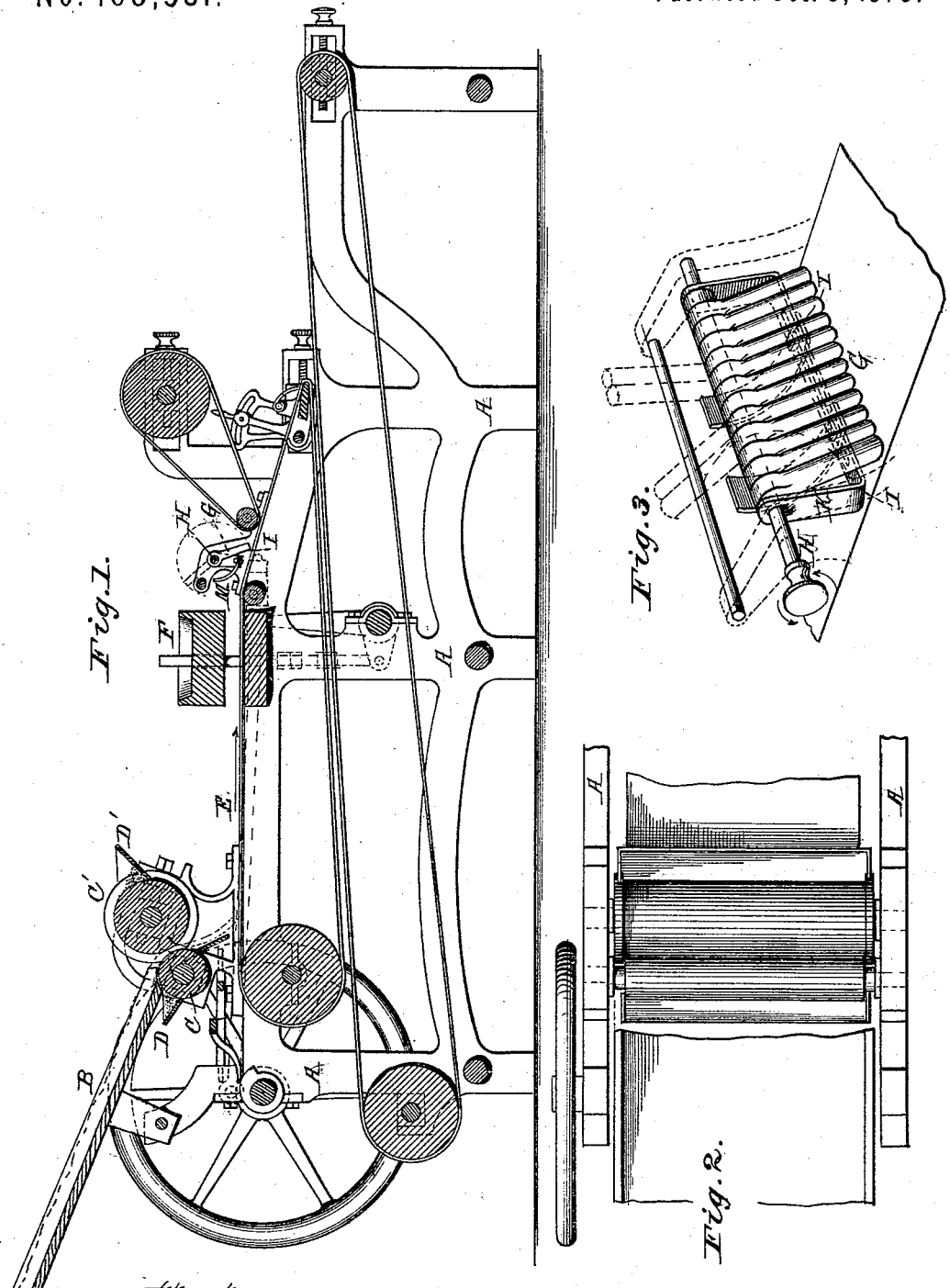

JAMES W. RUGER, OF BUFFALO, NEW YORK.

IMPROVEMENT IN CRACKER-MACHINES.

Specification forming part of Letters Patent No. 168,531, dated October 5, 1875; application filed July 30, 1875.

*To all whom it may concern:*

Be it known that I, JAMES W. RUGER, of Buffalo, in the county of Erie and State of New York, have invented certain new and useful Improvements in Machines for Making Crackers, of which the following is a specification:

This invention relates to certain improvements in the mechanism for flouring the dough-rollers, and for separating the crackers from the "scrap," in that class of cracker-machines in which the dough is formed into a sheet, and carried beneath a vertically-reciprocating cutter, to be formed into crackers, by means of an endless apron.

The invention consists, first, in the combination, with the forming-rollers for spreading the dough into a sheet, of an improved device for flouring said rollers, to prevent the dough from adhering to the same and other parts of the apparatus while passing through the same, consisting essentially of an inclined shelf arranged transversely across the machine opposite each roller, the lower edges of said shelf being closely in contact with said rollers, forming troughs for the reception of the flour, from which it will be transferred directly to the rollers as they revolve, as more fully hereinafter shown and described; and, second, in an improved device for operating the fingers for separating the crackers from the scrap after the same have been cut from the dough, consisting essentially of a swinging finger-bar provided with a series of curved arms, which are capable of a lateral adjustment thereon, for the purpose of raising said fingers simultaneously, and dropping them in any predetermined number or position, to accommodate them to different sizes of crackers.

In the drawing, Figure 1 represents a longitudinal vertical section of the improved cracker-machine; Fig. 2, a view looking down upon the top of the dough-rollers; and Fig. 3, a perspective view of the fingers for separating the crackers from the scrap, and the mechanism for operating the same.

The letter A represents the frame carrying the various working parts of the apparatus, and B the feeding-table, upon which the dough is placed to be fed between the rollers. C and C' represent the rollers, journaled to suitable standards on opposite sides of the machine, in such position that the line of intersection of the peripheries of the two, or where they approach each other, shall be just at the lower edge of the inclined feed-table. D and D' represent two inclined shelves extending transversely across the frame of the machine, and secured at opposite sides to the standards in which the rollers are journaled. The lower edges of said shelves set closely to the peripheries of the rollers, forming troughs for the reception of flour for flouring the rollers as they revolve. E represents the endless band or apron for conveying the sheet of dough, as it passes from between the rollers, to the reciprocating cutter F, both the apron and cutter being constructed and arranged in the usual manner, which it is not necessary more particularly to describe, as they form no part of the present invention. Immediately to the rear of the reciprocating cutter are located the separating-fingers or separators G, which are attached loosely and independently to the bar H, extending transversely across the apparatus, and secured in suitable standards at each side of the frame A. The object of these fingers is to separate the crackers from the scrap as they pass beneath, and it is customary to raise and drop the same by hand, one or more at a time, when necessary; but it is often necessary to raise them all at once, and to drop a predetermined number, or a series of particular fingers simultaneously, which cannot be done by hand. To accomplish this a swinging finger-bar, I, is swiveled by arms K to the bar H, said finger-bar falling underneath the fingers, but out of the way of the passing dough. A longitudinal slot is formed in said bar, extending nearly its whole length, in which is bolted, by means of adjustable screw-nuts E, a series of curved arms, M, which are adapted to strike and drop any two or more of the fingers, as may be desired, upon properly rotating the bar or shaft H. By means of the finger-bar the whole of the fingers may be raised simultaneously, or all remaining after the passage of the arms may be thrown down.

Having thus described my invention, what I claim, and desire to secure by Letters Patent, is—

1. In a cracker-machine, the combination, substantially as described, of the inclined shelves extending across the apparatus, and having their lower edges setting closely against the dough-rollers, forming troughs for holding flour and distributing the same to the rollers, as set forth.

2. In a cracker-machine, the combination, substantially as described, of the separating-fingers for separating the crackers from the scrap, and the finger-bar carrying adjustable curved arms for raising and throwing down the fingers, as specified.

In testimony that I claim the foregoing I have hereunto set my hand in the presence of the subscribing witnesses.

JAMES W. RUGER.

Witnesses:
JAMES L. NORRIS,
ALBERT H. NORRIS.